Patented May 21, 1946

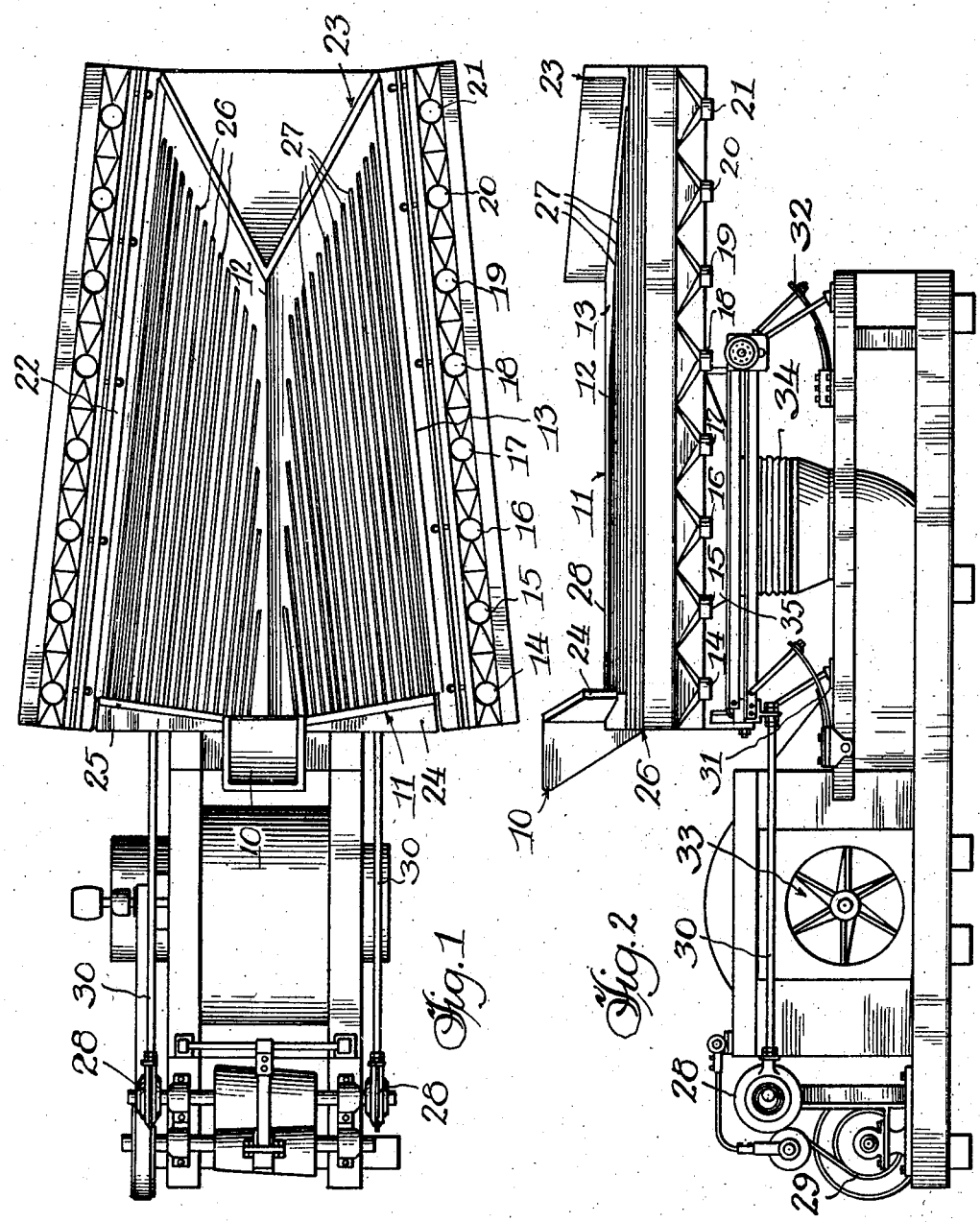

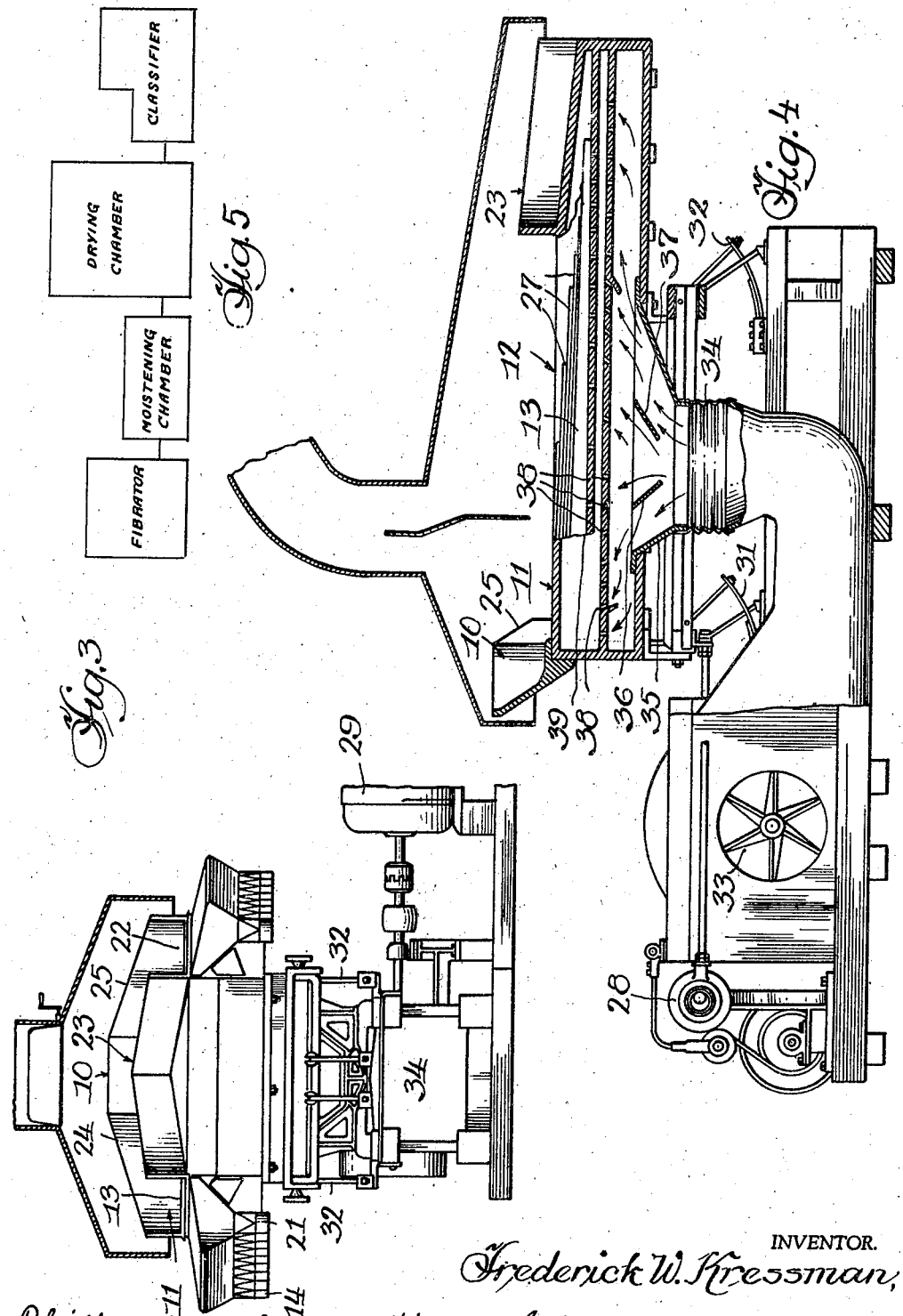

2,400,546

UNITED STATES PATENT OFFICE 2,400,546

PROCESS OF PREPARING FIBROUS PRODUCT FROM WOOD

Frederick W. Kressman, Laurel, Miss., assignor to Continental Turpentine & Rosin Corp., Inc., Laurel, Miss., a corporation of Mississippi Application November 21, 1942, Serial No. 466,523

4 Claims. (Cl. 202—39)

This invention relates to a wood product and process of preparing the same, and more particularly to a process of preparing highly absorbent wood fibers of substantially uniform density.

One feature of this invention is that wood may be reduced to a fibrous form with a minimum of tearing, breaking, or laceration of the fibers; another feature of this invention is that a wood product of substantially uniform absorbent quality is obtained. Still another feature of this invention is that organic liquids may be removed from wood without appreciable weakening of the fibers; a further feature of the invention is the treatment of the wood particles or fibers with steam, which serves to remove the organic solvent and organic materials dissolved therein from the wood particles and at the same time serves to increase the moisture content of the wood, the increase in the moisture content of the wood being beneficial in the subsequent steps in which the particles of wood are separated according to their densities.

Other features and advantages will be apparent from the specification and the drawings, in which—

Fig. 1 is a plan view of an air classifier; Fig. 2 is a side elevational view; Fig. 3 is an end elevation; Fig. 4 is a side elevational view, partly in section, all of the same device; and Fig. 5 is a diagrammatic view showing broadly the steps of the process of the invention.

It has long been common in the art to treat wood, such as yellow pine, to obtain therefrom turpentine, rosin, and other organic products. It has been the practice to take stumps of yellow pine or other suitable wood of little value, and reduce the material to small chips by a hogging or shredding operation. The chips are steamed to remove turpentine and other volatile organic compounds, then extracted with an organic solvent to obtain the rosin, and finally steamed again to remove the solvent. After these operations, the chips have no further usefulness and are discarded or used for fuel.

I have found that these chips may be reduced to a fibrous absorbent form and in this state become adapted to many uses. For instance, it may be used as an absorbent material in roofing felt.

Even when the wood is properly reduced to the fibrous form, extraction is desirable to provide a maximum absorbent equality. Not only are the organic liquids, which are removed, of great value, but the resulting product is much more porous. In addition, many small hard non-absorbent particles result from the fibration process. To obtain a satisfactory product, it is necessary that these be separated from the fibrous material.

I have found that wood, preferably in the form of chips or other small pieces, may be fibrated to obtain an absorbent product. At this point, the wood may be extracted with a suitable organic solvent, and then treated with steam to remove the solvent. The non-absorbent particles should then be separated from the resulting product, in order to obtain a commercially useful absorbent material.

The process of fibrating the wood may be carried out in a Banbury mixer, such as that described in Patent No. 1,523,387, or other suitable machine. Although the Banbury machine was designed for and used in the mixing of rubber, it is admirably adapted to this purpose.

In operation, the pieces of wood are subjected to frictional contact with two irregularly shaped members, which are rotated within the mixing chamber. For convenience in loading, I prefer to add to the Banbury machine an additional chamber of approximately the same size as the mixing chamber. The additional chamber may be used as a reservoir, containing a complete charge ready for introduction into the mixing chamber.

The rotating members in the mixing chamber subject the wood to frictional, twisting, shearing, shredding contact with each other and with the walls of the chamber. This action serves to reduce the wood to the fibrous form with a minimum of tearing, lacerating or breaking of the fibers. Most of the disintegration is effected along the line of the grain of the wood.

If desired, a lubricant may be used in the fibrating operation to reduce the laceration or breaking of the fibers in this step. Most oils are suitable lubricants for this purpose, and a small quantity of oil may be introduced into the mixing chamber with the wood. In the case of wood which contains large quantities of rosin, such as yellow pine for example, the lubricant may, if desired, be eliminated since the large quantity of the rosin in the wood performs the lubricating function. In the Banbury machine, the frictional action develops a considerable amount of heat, and the resulting temperature in the mixing chamber is sufficient to reduce the viscosity of the rosin and permit it to act effectively as a lubricant.

If the temperature of the mixing chamber is controlled, it should not be maintained at less than 200–215° F. The high pressure which is developed in the process is also an aid in reducing the wood to fibrous form.

The product of the Banbury machine consists of long thin fibers of wood with smaller fibers extending therefrom, referred to herein as bundles of fibers. Most of the disintegration takes place along the lines of the grain of the wood. As a result, the fibers are of relatively small dimensions transverse to the grain. Such fibers are highly absorbent and porous, as compared to sawdust or other forms of wood reduced to small particles, such as the products of a grinding or attrition mill. To distinguish from these and other methods of reducing wood to small particles, I refer to the process of reducing wood to fibrous form by a Banbury mixer or like machine as a wood fibrating process.

The former process for recovering organic liquids from the wood, to-wit: steaming, extraction, and then steaming, when applied to the fibrated product, tends to weaken the fibers and impair their usefulness. I have found that by treating the fibers with a volatile petroleum solvent, boiling below 250° F., substantially all of the turpentine and turpenes, as well as the rosin, may thereby be removed and recovered. Any suitable extraction apparatus may be used for this purpose. The various organic liquids removed from the wood may thereafter be separated by fractional distillation. The organic solvent may be removed from the fibers by subjecting them to steam, or, if it is not desirable to attempt to recover the solvent, merely by a conventional drying operation.

The extracted fibrated product is in a highly absorbent porous condition and contains, after the steaming operation, a high percentage of moisture, usually about 40 per cent. It may be placed in a conventional dryer and the moisture content reduced to approximately 15 per cent. The step of separation of undesirable particles by means of an air classifier may be carried out with material having a moisture content as low as one per cent. On the other hand, the same step may be carried out with material having a high moisture content, although 35 per cent or more of moisture is undesirable. However, for most efficient results, I prefer to reduce the moisture only to between 12 per cent and 20 per cent.

Many of the particles found in the product are, however, relatively non-absorbent, and the product as a whole is unsatisfactory for commercial use unless these particles are removed. The absorbent qualities are not related to the size of the particles, but are directly related to their density.

The steaming operation, by which the organic solvent together with the organic materials dissolved therein are removed from the wood fibers, also serves to increase the moisture content of the fibers. Although the more absorbent and more fibrous particles tend to absorb a greater quantity of moisture, the steaming operation, in order to be effective for the removal of the organic liquids, is normally sufficiently intensive to increase the moisture content in all of the particles. The difference in the quantity of moisture absorbed by the highly fibrous particles and the less fibrous particles will usually be relatively slight, particularly when a high percentage of moisture, such as 40% for example, is incorporated in the fibrated product. The subsequent drying operation to which the fibers are subjected removes a greater quantity of moisture from the highly fibrous and highly absorbent particles than from the woody and less fibrous particles. Since the woody and less fibrous particles are normally of a greater density than the more absorbent fibers, the drying operation tends to increase the density differential between the particles. This is particularly important where only a portion of the moisture is removed by the drying operation. By referring to the moisture content to which the particles are reduced in the drying operation in terms of percentage of moisture, the average moisture content of the particles is meant. The highly absorbent fibrous particles will, of course, contain a lower percentage of moisture than the woody, less fibrous particles.

By treating the fibrated product with an air classifier, substantially all of the non-absorbent particles may be removed. By the term "air classifier" is meant a device which, by passing the particles through a rapidly flowing current of air, separates them according to their densities. A specific air classifier, for example, is disclosed herein.

In an air classifier of the structure which I prefer to use, a hopper 10 is mounted above the head of a shaker table 11. From a center line peak 12 the side 13 of the table 11 is inclined downwardly to the receptacles 14 to 21, inclusive, and the side 22 is inclined downwardly to similar receptacles on the other side of the table. At the end of the table opposite the hopper 10, a V-shaped guard 23 prevents material from passing over the end of the table. Guards 24 and 25, mounted adjacent the hopper 10, serve the same purpose at the other end.

The top surface of the table 11 supports a series of riffles or fins 26 and 27 on either side of the peak. The riffles are higher at one end than the other and are mounted in such a manner that the higher ends are adjacent to the guards 24 and 25. The lower ends approach the center line of the table. Therefore, since the riffles 27 are in a position substantially parallel to each other, they are graduated in length in order that none may cross the center line of the table.

The table 11 is agitated or shaken by the eccentric 28, driven by the motor 29, and connected to the table 11 by the member 30. Resilient sliding rocker arms 31 and 32 aid in controlling the motion.

A fan 33 forces a rapidly flowing current of air through the flexible duct 34 into the chamber 35. Deflectors or louvers 36 and 37 carried by the base of the table tend to distribute the current of air evenly along the lower surface of the table. The air then flows through a series of transverse apertures, such as the aperture 38, in the table, and through any material which may have been deposited on the table.

In operation, the fibrated extracted wood product is fed into the hopper 10 and from there deposited upon the table 11 adjacent the guards 24 and 25. The reciprocal agitation of the table 11 gradually carries the material towards the guard 23. In the meanwhile, the rapidly flowing current of air being blown through the material raises the particles of low density above the series of riffles 26 and 27 and permits them to pass down the sides 13 and 22 of the table 11 to the receptacles on either side.

The product collected in the receptacles 14 to 19, inclusive, is of substantially uniform density and of high absorbent quality, while that collected in the receptacles 20 and 21 is heavier and of lower absorbent quality. This latter material is again fed through the air classifier. The coarse material, on the other hand, passing off the end of the table, is discarded.

I have found that the highly absorbent material is also the most readily dried. Thus, when the fibrated extracted product leaves the drier, the non-absorbent particles will contain somewhat more moisture than the desired product. Since moisture increases the density of the product, this aids in the separation. Therefore, it is preferable that the average moisture content of the particles be at least 15 per cent when the particles leave the drier.

The final product consists of a wood product in the form of long, thin, porous, highly absorbent fibers from which substantially all of the organic substances, originally absorbed by the wood, have been removed. The bundles of fibers retain most of their original strength and are substantially uniform in absorbent quality. This product is extremely useful in any instance where a relatively inexpensive absorbent material is needed. For instance, this material may be used to partially or wholly replace the rag content of waterproof roofing felts.

This application is a continuation-in-part of my co-pending application Serial No. 238,688, filed November 3, 1938, for Wood Product and Process of Preparing the Same.

Although the invention has been described in connection with a specific embodiment, the foregoing detailed description is for the purpose of illustration only. It will be understood, therefore, that changes and modifications may be readily made in the process and product without departing from the spirit and scope of the invention.

I claim:

1. A process of the character described for preparing highly absorbent cellulose material from wood, comprising fibrating small pieces of wood by subjecting them to a twisting, shearing, shredding, frictional action in a chamber to form fibrous particles of different absorbent qualities, the major portion of the particles being highly fibrous in character and other particles being woody and less fibrous and having a greater density than the highly fibrous particles, subjecting the fibrated product to extraction with a volatile organic solvent, steaming the product to remove the organic solvent therefrom and to increase the moisture content of the fibers, subjecting all of the particles to substantially uniform drying conditions for a sufficient length of time to remove a greater quantity of moisture from the highly fibrous particles than from the less fibrous particles whereby an increase in the density differential between the highly fibrous particles and the less fibrous woody particles is effected, and thereafter removing therefrom the particles of relatively high density by means of an air classifier.

2. A process of the character described for preparing highly absorbent cellulose material from wood, comprising fibrating small pieces of wood by subjecting them to a twisting, shearing, shredding, frictional action in a chamber to form fibrous particles of different absorbent qualities, the major portion of the particles being highly fibrous in character and other particles being woody and less fibrous and having a greater density than the highly fibrous particles, extracting the fibrated product with a volatile organic solvent, removing the organic solvent by means of steam, subjecting all of the particles to substantially uniform drying conditions for a sufficient length of time to remove a greater quantity of moisture from the highly fibrous particles than from the less fibrous particles whereby an increase in the density differential between the highly fibrous particles and the less fibrous woody particles is effected, passing said fibers longitudinally over and along a group of substantially parallel riffles, said riffles being longitudinally mounted on a transversely inclined platform, passing a rapidly flowing current of air from below said riffles through said fibers, reciprocally and longitudinally agitating said platform, and collecting the fibers of relatively low density.

3. A process of the character described for preparing highly absorbent cellulose material from wood, comprising fibrating the wood to form fibrous particles of different absorbent qualities, the major portion of the particles being highly fibrous in character and the other particles being woody and less fibrous and having a greater density than the highly fibrous particles, subjecting all of the fibrated particles to extraction with a volatile organic solvent, treating all of the fibrated particles with steam under substantially uniform conditions to remove the organic solvent therefrom and to introduce a relatively large percentage of moisture into the product, subjecting all of the particles to substantially uniform drying conditions for a sufficient length of time to remove a greater quantity of moisture from the highly fibrous particles than from the less fibrous particles whereby an increase in the density differential between the highly fibrous particles and the less fibrous woody particles is effected, and subjecting the mixture of particles to air classification to separate the particles of low density from the particles of high density.

4. A process of the character described for preparing highly absorbent cellulose material from wood, comprising fibrating the wood to form fibrous particles of different absorbent qualities, the major portion of the particles being highly fibrous in character and the other particles being woody and less fibrous and having a greater density than the highly fibrous particles, subjecting the particles to extraction with a volatile organic solvent to remove therefrom the soluble organic materials therein, treating the fibrated particles with steam under substantially uniform conditions to remove therefrom the organic solvent and to introduce a relatively large percentage of moisture into the product, subjecting all of the particles to substantially uniform drying conditions to materially reduce the average moisture content of the particles to approximately fifteen per cent whereby an increase in the density differential between the highly fibrous particles and the less fibrous woody particles is effected, and subjecting the mixture of particles to air classification to separate the particles of low density from the particles of high density.

FREDERICK W. KRESSMAN.